(12) United States Patent
Eberle et al.

(10) Patent No.: US 9,126,637 B2
(45) Date of Patent: Sep. 8, 2015

(54) MOTOR VEHICLE REAR

(71) Applicant: Dr. Ing. h.c. F. Porsche Aktiengesellschaft, Stuttgart (DE)

(72) Inventors: Wilfried Eberle, Ehingen (DE); Herbert Klamser, Korntal-Muenchingen (DE); Franz-Rudolf Wierschem, Weissach (DE); Gerald Hekmann, Ludwigsburg (DE); Daniel Haag, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/574,489

(22) Filed: Dec. 18, 2014

(65) Prior Publication Data

US 2015/0166109 A1   Jun. 18, 2015

(30) Foreign Application Priority Data

Dec. 18, 2013   (DE) .......................... 10 2013 114 311

(51) Int. Cl.
*B60K 1/04* (2006.01)
*B62D 21/15* (2006.01)
*B60R 19/18* (2006.01)

(52) U.S. Cl.
CPC ............... *B62D 21/152* (2013.01); *B60K 1/04* (2013.01); *B60R 19/18* (2013.01); *B60K 2001/0416* (2013.01)

(58) Field of Classification Search
CPC . B60K 1/04; B60K 2001/0416; B62D 21/152
See application file for complete search history.

(56) References Cited

U.S. PATENT DOCUMENTS

| 8,708,401 B2 | 4/2014 | Lee et al. |
| 2008/0283317 A1 | 11/2008 | Wagner et al. |
| 2009/0026802 A1* | 1/2009 | Imada et al. ............. 296/187.11 |
| 2012/0153677 A1* | 6/2012 | Matsuura et al. ........ 296/193.08 |

FOREIGN PATENT DOCUMENTS

| DE | 102010018729 | 11/2011 |
| FR | 2945769 | 11/2010 |

* cited by examiner

*Primary Examiner* — Faye M Fleming
(74) *Attorney, Agent, or Firm* — Gerald E. Hespos; Michael J. Porco; Matthew T. Hespos

(57) ABSTRACT

A motor vehicle rear (10) has left and right longitudinal members (12) forming a supporting structure of the motor vehicle. A receiving housing (18) is arranged between the longitudinal members (12) for receiving a traction battery. The receiving housing (18) has a left and right side walls (22, 24) running in the forward direction of travel. A back wall (20) is connected to the left and right side walls (22) and running transverse to the forward direction of travel. An impact profile (26) is connected to the left and right longitudinal members (12, 14) and absorbs impact energy in the event of a rear crash. Left and right reinforcing elements (32 34) connect the impact profile (26) to the respective left and right side walls (22, 24) for reinforcing the impact profile (26) and conducting away some of the impact energy into the left and right side walls (22, 24).

12 Claims, 3 Drawing Sheets

MOTOR VEHICLE REAR

CROSS REFERENCE TO RELATED APPLICATION

This application claims priority under 35 USC 119 to German Patent Appl. No. 10 2013 114 311.3 filed on Dec. 18, 2013, the entire disclosure of which is incorporated herein by reference.

BACKGROUND

1. Field of the Invention

The invention relates to a motor vehicle rear that is configured to receive an object, such as a traction battery for purely electrical drive of the motor vehicle.

2. Description of the Related Art

U.S. Pat. No. 8,708,401 discloses a motor vehicle rear with a motor vehicle battery arranged in the rear region of the motor vehicle. An impact frame for absorbing impact energy is provided between a bumper and the motor vehicle battery to protect the motor vehicle battery in the event of a rear crash. The impact frame has a rear bow connected to a trapezoidal front bow via deformable structures running in the longitudinal direction. The front bow has a subsection that runs in the transverse direction parallel to the motor vehicle battery and is connected to longitudinal members of the motor vehicle via connecting pieces that run obliquely with respect to the longitudinal direction of the motor vehicle, and therefore the front bow engages around part of the motor vehicle battery.

There is a constant need, with little structural outlay, to protect sensitive objects from damage.

The object of the invention is to protect sensitive objects, such a traction battery, from damage with little structural outlay.

SUMMARY OF THE INVENTION

The invention relates to a motor vehicle rear with left and right longitudinal members that form supporting structures of the motor vehicle and a receiving housing arranged between the left and right longitudinal members for receiving a traction battery. The receiving housing has left and right side walls running substantially in the forward direction of travel and a back wall that is connected to the left and right side walls and runs substantially transversely with respect to the forward direction of travel. An impact profile is connected level with the receiving housing to the left and right longitudinal members and is intended for absorbing impact energy in the event of a rear crash. A left reinforcing element connects the impact profile to the left side wall for reinforcing the impact profile and conducting away some of the impact energy into the left side wall, and/or a right reinforcing element connects the impact profile to the right side wall for reinforcing the impact profile and conducting away some of the impact energy into the right side wall.

The impact profile can dissipate impact energy in the event of a rear crash, such as a rear end collision of two motor vehicles, and/or can absorb the impact energy by plastic deformation. In particular, the reinforcing element that is connected to the impact profile can also absorb impact energy by plastic deformation. However, in the event of a particularly severe rear crash, it is possible that the impact profile is deformed sufficiently to strike against the receiving housing. The reinforcing element is arranged between the side walls and the impact profile. Thus, when the impact profile strikes against the receiving housing, impact energy that is not absorbed by the impact profile and the reinforcing element can be conducted into the side wall of the receiving housing. The side wall in turn can dissipate the impact energy onto the supporting structure of the motor vehicle. As a result, the impact energy is not introduced into the back wall of the receiving housing, or at least is reduced to such an extent that, in the event of a rear crash, for example with a speed difference of 50 km/h, the back wall of the receiving housing is not pressed into the interior of the receiving housing to such an extent that a traction battery in the receiving housing and/or a battery cell can be damaged by the back wall. Instead, the impact energy can be conducted away onto the side wall past those points of the back wall that are easily bendable in comparison to the fastening points of the back wall.

In the event of a rear crash, the impact energy loads the side wall substantially in the longitudinal direction. The side wall can act substantially as a compression bar, and therefore, in comparison to the back wall, correspondingly higher forces can be dissipated without component failure. In addition, in the event of component failure of the side wall, for example due to buckling, the side wall would tend to bend away from the traction battery or other object arranged or inserted with an interference fit into the receiving housing. Therefore, the risk of the side wall damaging the object arranged in the receiving housing is reduced. In addition, the side wall is generally part of a box-shaped structure, and therefore the side wall is clamped at a plurality of points along its longitudinal direction, including at least at an upper and/or lower edge. The side wall thus is correspondingly stiff and fails only in the event of a correspondingly increased buckling load. In the event of a particularly severe rear crash, impact energy that is not absorbed by the impact member can be conducted past the back wall via the reinforcing element to the side wall, from which the impact energy can be dissipated onto the supporting structure. Therefore, objects in the receiving housing will not be damaged by deformation of the receiving housing. Thus, a traction battery or other sensitive object can be protected from damage with little structural outlay.

The reinforcing element can reinforce the impact profile so that, in the event of plastic deformation of the impact profile, the reinforcing element does not drift out of alignment with the side wall. In particular, the reinforcing element protrudes from the impact profile in the forward direction of travel, and therefore, even when plastic deformation of the impact profile has occurred, the impact profile will not strike an easily deformable region of the back wall. Thus, the impact profile and connections that optionally are connected in between for connecting the impact profile to the respective longitudinal member can be arranged entirely behind the receiving housing. Therefore, the impact profile and the connections do not even at least partially engage around the receiving housing. The construction space usable for mounting objects is not reduced significantly, at least in the transverse direction. The impact profile, comparably to a bumper, may be part of a bar structure running in the transverse direction and, as a result, is not part of a frame structure. This avoids two or more components that run in the transverse direction and are connected to each other in the manner of a frame via intermediate pieces running in the longitudinal direction, and hence a frame structure does not need to be connected to the longitudinal members. This makes it possible to keep the required construction space very low, and even motor vehicles that already have been manufactured can be retrofit cost-effectively. The receiving housing can be a battery housing of a traction battery and can contain battery cells. The supporting structure may be part of a vehicle undercarriage or vehicle frame and is designed as a supporting component for dissipating loads occurring during operation of the motor vehicle.

A left supporting stop is provided in front of the left side wall in the forward direction of travel for conducting away impact energy dissipated via the left side wall onto the supporting structure, and/or a right supporting stop is provided in front of the right side wall in the forward direction of travel for conducting away impact energy dissipated via the right side wall onto the supporting structure. The supporting stop ensures that the force of the impact energy dissipated via the side wall can be continued with a defined direction. In particular, the impact energy can be conducted away to the supporting structure via the supporting stop. A supporting stop may be provided only for the side walls, i.e. not for a front wall connected to the side walls. The supporting stop may be matched to the contour of the side wall and thereby permits a linear striking at least over part of the vertical extent of the side wall so that a spot-like contact with high surface pressure is avoided.

The receiving housing may be inserted at least partially in a receiving recess formed by a motor vehicle body. In the event of a rear crash, the receiving recess can block a bulging out of the side wall, and therefore avoids buckling of the side wall.

The impact profile may have a profile that is arcuately convex counter to the forward direction of travel. In the event of a rear crash, the impact profile can be pressed in the forward direction of travel, thus enabling the rigidity to be increased. Thus, the impact profile can absorb and/or dissipate correspondingly high impact energy.

The impact profile may be supported substantially transversely with respect to the forward direction of travel on a left inner side of the left longitudinal member facing toward the right longitudinal member, and on a right inner side of the right longitudinal member facing toward the left longitudinal member to dissipate impact energy. The impact profile can be supported in the transverse direction on the stiff longitudinal members when the impact profile is deformed. Therefore the fastening of the impact profile to the longitudinal members is self-reinforcing. In particular, a fastening bolt running transverse to the direction of force will not shear off in the event of a crash.

The impact profile may be an extruded profile, such as an extruded aluminum profile. Thus, the impact profile can be produced cost-effectively from a lightweight material. In particular, the impact profile can have a cross-section that is suitable for absorbing impact energy, such as struts running within an outer hollow profile.

The impact profile and/or at least one of the left and right reinforcing elements may define a chamber profile with a plurality of chambers. The chambers may be formed by channels running substantially transversely with respect to the forward direction of travel. The individual chambers can be deformed plastically in the event of a rear crash, and therefore at least some of the impact energy can be absorbed. Thus, a significantly large portion of the impact energy can be absorbed by the impact profile and/or by the respective reinforcing element by plastic deformation of the chambers, and therefore correspondingly smaller forces are introduced into the side wall.

The impact profile may be connected to the left and right longitudinal members via left and right brackets, such as angled brackets. More particularly, impact profile may be connected releasably to the respective brackets, such as by screwing. The brackets may be welded to the respective left and right longitudinal members at a plurality of points with weld seams running in different directions. This permits simple and rapid installation. Additionally, the connection of the impact profile to the longitudinal members can be self-reinforcing in the event of a rear crash.

The impact profile preferably is arranged in the forward direction of travel between the receiving housing and a bumper for receiving impact energy in the event of a rear crash. The bumper may be connected to rear ends of the left and right longitudinal members via crash boxes or other deformation elements for absorbing the impact energy. Hence, the impact profile is provided in addition to the bumper, and therefore a significant portion of the impact energy in the case of slight bumps can be absorbed by the bumper and/or the deformation elements. The impact profile and the bumper may be at least partially at a common height, and therefore the impact profile and the bumper at least partially overlap as viewed in the forward direction of travel.

A lock crossmember for forming a lock recess for a trunk lock may be connected to the left longitudinal member and to the right longitudinal member. The impact profile runs over its entire transverse extent with respect to the forward direction of travel below the lock recess in the direction of gravity. Thus, the impact profile can be below the lock recess in a vertical extension of the trunk lock, and the impact profile can be integrated into a back wall of the motor vehicle body in a manner that saves construction space. The lock crossmember can form a suitable cutout for the impact profile. The lock recess can define a vertical height level beyond which the impact profile does not project in the vertical direction. In particular, the impact profile does not, as a result, have any lugs protruding vertically laterally with respect to the lock recess. Thus, a high degree of stability and/or a high absorption capacity of impact energy for the impact profile can be achieved with little use of material.

The invention is explained by way of example below using preferred exemplary embodiments with reference to the attached drawings, wherein the features illustrated below can represent one aspect of the invention both individually in each case and in combination.

DETAILED DESCRIPTION

Figure 1:
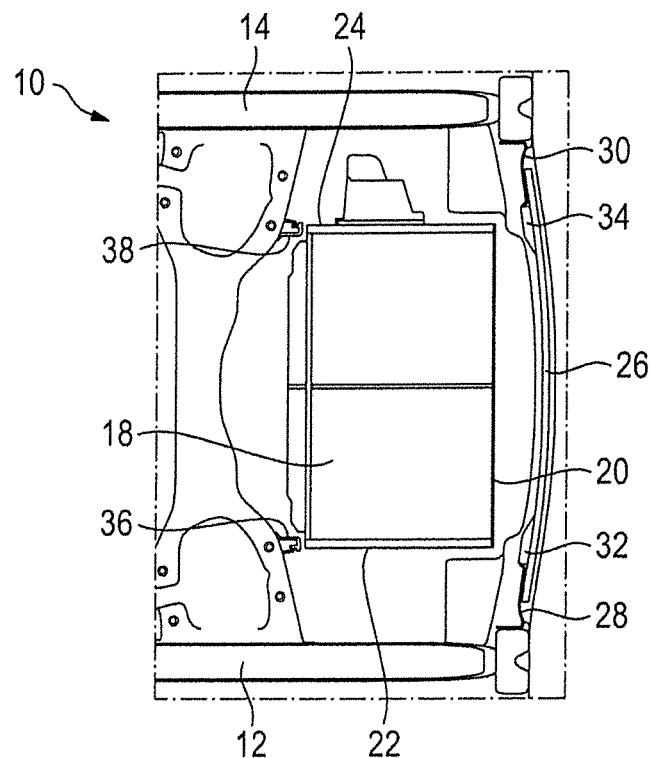
FIG. 1 is a schematic top view of a motor vehicle rear.
Figure 2:
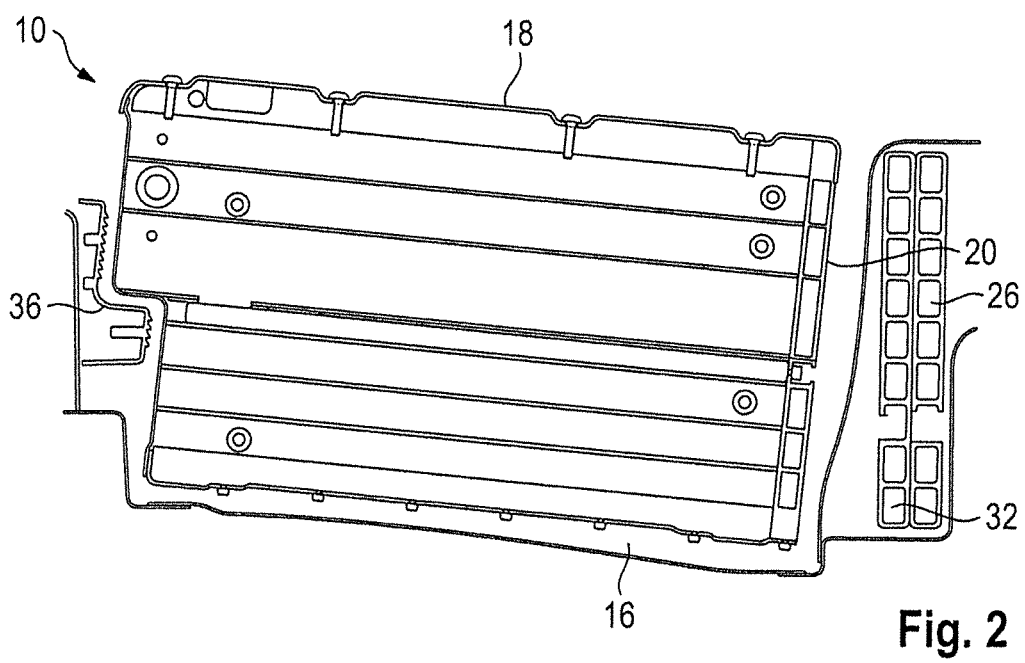
FIG. 2 is a schematic sectional view of the motor vehicle rear of FIG. 1.

The vehicle rear 10 illustrated in FIGS. 1 and 2 has left and right longitudinal members 12 of a supporting structure of a motor vehicle. A receiving recess 16 is between the left and right longitudinal members 12 and 14 and receives a receiving housing 18 for a traction battery. The receiving housing 18 is configured as a box or a cube and has a back wall 20 connected to left and right side walls 22 and 24.

A rearwardly convex impact profile 26 is provided to protect the traction battery in the receiving housing 18 in the event of a rear crash. The impact profile 26 is connected on an inner side of the left longitudinal member 12 via an angular left bracket 28 and on an inner side of the right longitudinal member 14 via an angular right bracket 30. A left reinforcing element 32 is connected to the impact profile 26 in the longitudinal direction behind the left side wall 22, while a right reinforcing element 34 is connected to the impact profile 26 in the longitudinal direction behind the right side wall 24. In particular, the reinforcing elements 32, 34 extend over substantially the same vertical height as the impact profile 26. Some of the impact energy can be dissipated to the side walls 22, 24 via the reinforcing elements 32, 34 if the impact profile 26 is deformed in the event of a powerful rear crash. Therefore substantially no impact energy arrives at the back wall 20. The left side wall 22 can strike against a left supporting stop 36 while the right side wall 24 can strike against a right supporting stop 38 in the event of a crash. The forces conducted away via the side walls 22, 24 can be conducted further onto the supporting structure via the supporting stops 36, 38.

Figure 3:
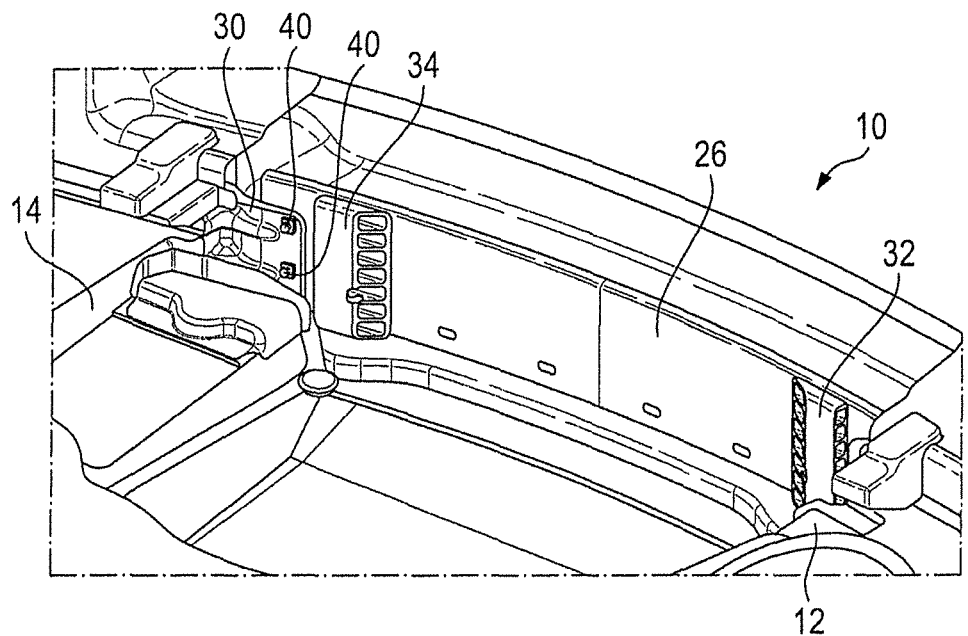
FIG. 3 is a schematic perspective view of the motor vehicle rear of FIG. 1, from the inside.
Figure 4:
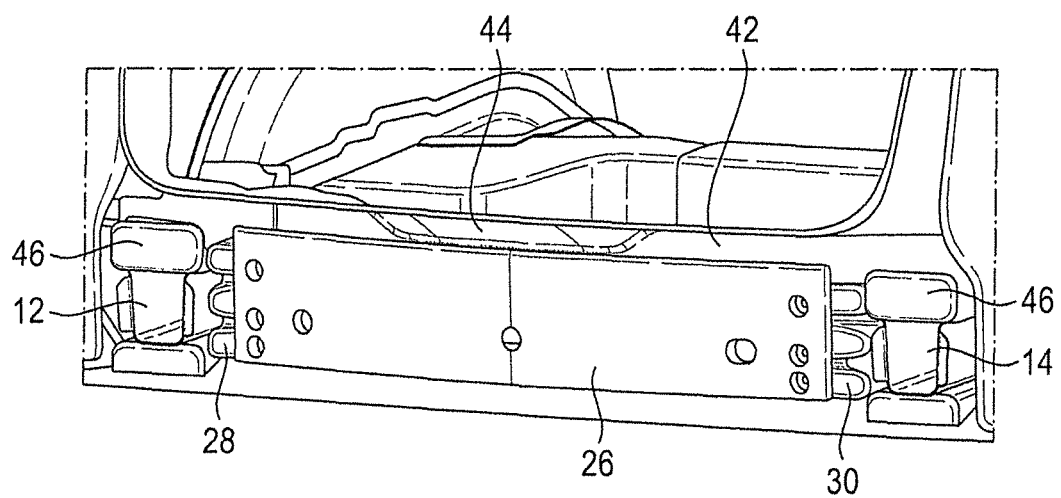
FIG. 4 is a schematic perspective view of the motor vehicle rear of FIG. 3, from the outside.
Figure 5:
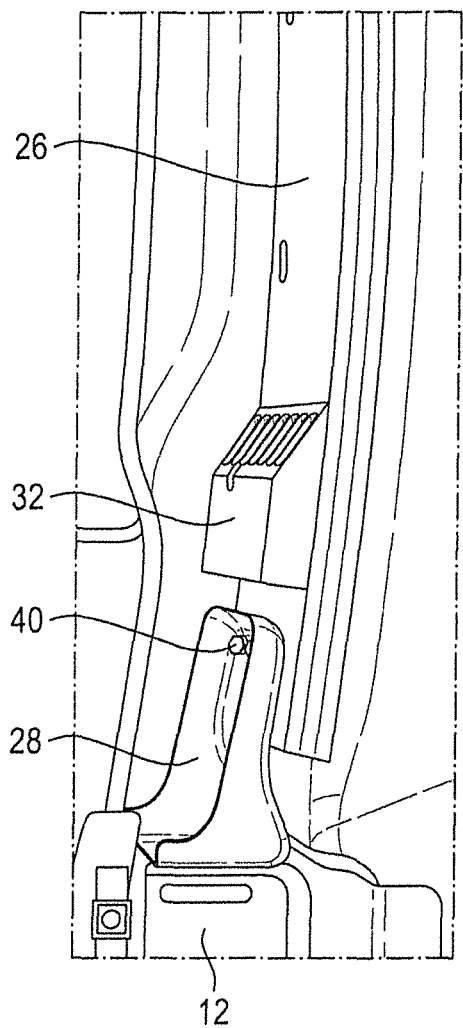
FIG. 5 is a schematic view of a detail of the motor vehicle rear of FIG. 3 from above.

As illustrated in FIG. 3, the impact profile 26 can be screwed to the brackets 28, 30. For this purpose, the respective bracket 28, 30 can have an internal thread and/or nuts 40 that are welded or similarly fastened, in particular to the respective bracket 28, 30. As illustrated in FIG. 4, a lock crossmember 42 with a lock recess 44 for a trunk lock can be connected to the longitudinal members 12, 14. The impact profile 26 is arranged over its entire extent transversely with respect to a forward direction of travel of the motor vehicle below the height level of the lock recess 44 in the direction of gravity. Furthermore, the left and right longitudinal members 12 and 14 each have a fastening flange 46 to which deformable crash boxes connected to a bumper can be fastened. In the event of a rear crash, impact energy can be introduced in the longitudinal direction into the longitudinal members 12, 14 via the crash boxes. As illustrated in FIGS. 1 and 5, the impact profile 26 is supported via the angled brackets 28, 30 on inner sides of the longitudinal members 12, 14 that oppose one another in the transverse direction. Therefore, when the convex impact profile 26 is deformed, the impact profile 26 is clamped in a self-reinforcing manner between the longitudinal members 12, 14.

What is claimed is:

1. A motor vehicle rear for a motor vehicle, comprising:
   left and right longitudinal members forming a supporting structure of the motor vehicle;
   a receiving housing arranged between the left and right longitudinal members for receiving a traction battery, the receiving housing having left and right side walls running substantially in a forward direction of travel, and a back wall connected to the left and right side walls and running substantially transverse to the forward direction of travel;
   an impact profile connected to the left and right longitudinal members at a height level with the receiving housing for absorbing impact energy in the event of a rear crash;
   left and right reinforcing elements connecting the impact profile to the respective left and right side walls for reinforcing the impact profile and conducting away some of the impact energy into the left and right side walls; and
   left and right supporting stops provided in front of the respective left and right side walls in the forward direction of travel for conducting away impact energy dissipated via the left and right side walls onto the supporting structure.

2. The motor vehicle rear of claim 1, wherein the receiving housing is at least partially inserted in a receiving recess formed by a motor vehicle body.

3. The motor vehicle rear of claim 1, wherein the impact profile is arcuately convex counter to the forward direction of travel.

4. The motor vehicle rear of claim 1, wherein the impact profile is supported substantially transversely with respect to the forward direction of travel on inwardly facing sides of the left and right longitudinal members to dissipate impact energy.

5. The motor vehicle rear of claim 1, wherein the impact profile is an extruded aluminum profile.

6. The motor vehicle rear of claim 1, wherein at least one of the impact profile, the left reinforcing element and the right reinforcing element has a plurality of chambers formed by channels running substantially transversely with respect to the forward direction of travel.

7. A motor vehicle rear for a motor vehicle, comprising:
   left and right longitudinal members forming a supporting structure of the motor vehicle;
   a receiving housing arranged between the left and right longitudinal members for receiving a traction battery, the receiving housing having left and right side walls running substantially in a forward direction of travel, and a back wall connected to the left and right side walls and running substantially transverse to the forward direction of travel;
   an impact profile connected to the left and right longitudinal members at a height level with the receiving housing for absorbing impact energy in the event of a rear crash; and
   left and right reinforcing elements connecting the impact profile to the respective left and right side walls for reinforcing the impact profile and conducting away some of the impact energy into the left and right side walls, wherein the impact profile is connected to the left longitudinal member via a left bracket and is connected to the right longitudinal member via a right bracket wherein the impact profile is connected releasably, in particular by screwing, to the left and right brackets and the left and right brackets being integrally bonded by welding, to the respective left and right longitudinal members.

8. The motor vehicle rear of claim 1, wherein the impact profile is arranged in the forward direction of travel between the receiving housing and a bumper for receiving impact energy in the event of a rear crash, wherein the bumper is connected to ends of the left and right longitudinal members via crash boxes for absorbing the impact energy.

9. A motor vehicle rear for a motor vehicle, comprising:
   left and right longitudinal members forming a supporting structure of the motor vehicle;
   a receiving housing arranged between the left and right longitudinal members for receiving a traction battery, the receiving housing having left and right side walls running substantially in a forward direction of travel, and a back wall connected to the left and right side walls and running substantially transverse to the forward direction of travel;
   an impact profile connected to the left and right longitudinal members at a height level with the receiving housing for absorbing impact energy in the event of a rear crash; and
   left and right reinforcing elements connecting the impact profile to the respective left and right side walls for reinforcing the impact profile and conducting away some of the impact energy into the left and right side walls, wherein a lock crossmember for forming a lock recess for a trunk lock is connected to the left and right longitudinal members, and the impact profile runs over its entire extent transversely with respect to the forward direction of travel at a position gravitationally below the lock recess.

10. A motor vehicle rear for a motor vehicle, comprising:
left and right longitudinal members forming a supporting structure of the motor vehicle;
a receiving housing arranged between the left and right longitudinal members for receiving a traction battery, the receiving housing having left and right side walls running substantially in a forward direction of travel, and a back wall connected to the left and right side walls and running substantially transverse to the forward direction of travel;
an extruded aluminum impact profile having a plurality of chambers formed by channels running substantially transversely with respect to the forward direction of travel, the impact profile being connected to the left and right longitudinal members at a common height level with the receiving housing for absorbing impact energy in the event of a rear crash, the impact profile being arcuately convex counter in a rearward direction on the motor vehicle; and
left and right reinforcing elements connecting the impact profile to the respective left and right side walls for reinforcing the impact profile and conducting away some of the impact energy into the left and right side walls.

11. The motor vehicle rear of claim 10, wherein the impact profile is supported substantially transversely with respect to the forward direction of travel on inwardly facing sides of the left and right longitudinal members to dissipate impact energy.

12. The motor vehicle rear of claim 11, further comprising a left and right supporting stops provided in front of the respective left and right side walls in the forward direction of travel for conducting away impact energy dissipated via the left and right side walls onto the supporting structure.

* * * * *